United States Patent
Agrawal et al.

(10) Patent No.: US 12,058,171 B1
(45) Date of Patent: *Aug. 6, 2024

(54) SYSTEM AND METHOD TO CREATE DISPOSABLE JUMP BOXES TO SECURELY ACCESS PRIVATE APPLICATIONS

(71) Applicant: AIRGAP NETWORKS INC., Santa Clara, CA (US)

(72) Inventors: Ritesh R. Agrawal, San Jose, CA (US); Vinay Adavi, Sunnyvale, CA (US); Satish M. Mohan, San Jose, CA (US); Balireddy Ramesh Kumar Reddy, Bangalore (IN)

(73) Assignees: Airgap Networks, Inc., Santa Clara, CA (US); Zscaler, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/498,182

(22) Filed: Oct. 31, 2023

Related U.S. Application Data

(63) Continuation-in-part of application No. 17/521,092, filed on Nov. 8, 2021, which is a continuation of application No. 17/357,757, filed on Jun. 24, 2021, now Pat. No. 11,171,985.

(51) Int. Cl.
*H04L 9/40* (2022.01)
*H04L 12/46* (2006.01)

(52) U.S. Cl.
CPC ...... *H04L 63/1466* (2013.01); *H04L 12/4641* (2013.01); *H04L 63/1416* (2013.01)

(58) Field of Classification Search
USPC .......................................... 726/23
See application file for complete search history.

(56) References Cited

U.S. PATENT DOCUMENTS

| | | |
|---|---|---|
| 6,611,925 B1 | 8/2003 | Spear |
| 6,914,905 B1 | 7/2005 | Yip et al. |
| 8,055,800 B1 | 11/2011 | Bardzil et al. |
| 8,312,270 B1 | 11/2012 | Chou |
| 8,347,349 B1 | 1/2013 | Wilson |

(Continued)

FOREIGN PATENT DOCUMENTS

| | | |
|---|---|---|
| CA | 2826385 A1 | 8/2012 |
| CN | 109450959 A | 3/2019 |

(Continued)

OTHER PUBLICATIONS

Thapa, Manish, "Mitigating Threats in IoT Network Using Device Isolation", Master's Thesis, Feb. 4, 2018, 73 pgs.

(Continued)

*Primary Examiner* — Brandon Hoffman
(74) *Attorney, Agent, or Firm* — Baratta Law PLLC; Lawrence A. Baratta, Jr.

(57) ABSTRACT

A technique to stop lateral movement of ransomware between endpoints in a VLAN is disclosed. A security appliance is set as the default gateway for intra-LAN communication. Message traffic from compromised endpoints is detected. Attributes of ransomware may be detected in the message traffic, as well as attempts to circumvent the security appliance. Compromised devices may be quarantined. A disposable jump box may be utilized to provide an additional layer of protection against ransomware.

22 Claims, 11 Drawing Sheets

(56) References Cited

U.S. PATENT DOCUMENTS

| | | |
|---|---|---|
| 8,683,052 B1 | 3/2014 | Brinskelle |
| 8,850,185 B1 | 9/2014 | Vaughn |
| 8,869,259 B1 | 10/2014 | Udupa |
| 9,225,736 B1 | 12/2015 | Roundy |
| 9,282,114 B1 | 3/2016 | Dotan |
| 9,306,965 B1 | 4/2016 | Grossman et al. |
| 9,602,529 B2 | 3/2017 | Jones et al. |
| 9,712,504 B2 | 7/2017 | Kurmala |
| 9,756,061 B1 | 9/2017 | Roeh |
| 10,298,599 B1 | 5/2019 | Zhang |
| 10,454,950 B1 | 10/2019 | Aziz |
| 11,030,311 B1 | 6/2021 | Lopez |
| 11,093,139 B1 | 8/2021 | Karr et al. |
| 11,171,985 B1 | 11/2021 | Agrawal |
| 11,240,242 B1 | 2/2022 | Celik |
| 11,252,183 B1 | 2/2022 | Agrawal |
| 11,303,669 B1 | 4/2022 | Agrawal |
| 11,303,673 B1 | 4/2022 | Agrawal |
| 11,323,474 B1 | 5/2022 | Agrawal |
| 11,374,964 B1 | 6/2022 | Agrawal |
| 11,818,176 B1 | 11/2023 | Wu |
| 2002/0080784 A1* | 6/2002 | Krumel .............. H04L 69/16 370/352 |
| 2003/0212907 A1 | 11/2003 | Genty |
| 2006/0028996 A1 | 2/2006 | Huegen |
| 2006/0074618 A1* | 4/2006 | Miller ............ G06F 11/3664 703/13 |
| 2007/0101432 A1 | 5/2007 | Carpenter |
| 2008/0184157 A1 | 7/2008 | Selig |
| 2009/0217346 A1 | 8/2009 | Manring |
| 2009/0328209 A1 | 12/2009 | Nachenberg |
| 2010/0281159 A1 | 11/2010 | Boscolo |
| 2012/0079122 A1 | 3/2012 | Brown |
| 2013/0298242 A1 | 11/2013 | Kumar |
| 2014/0020053 A1 | 1/2014 | Kay |
| 2014/0059642 A1 | 2/2014 | Deasy |
| 2015/0281172 A1 | 10/2015 | He |
| 2016/0197962 A1 | 7/2016 | Winn |
| 2016/0323318 A1 | 11/2016 | Terrill et al. |
| 2017/0039310 A1 | 2/2017 | Wang |
| 2017/0085530 A1 | 3/2017 | Volkov |
| 2017/0093910 A1 | 3/2017 | Gukal |
| 2017/0149775 A1 | 5/2017 | Bachar et al. |
| 2017/0289134 A1 | 10/2017 | Bradley |
| 2017/0289191 A1 | 10/2017 | Thioux |
| 2017/0339190 A1 | 11/2017 | Epstein |
| 2017/0339250 A1 | 11/2017 | Momchilov |
| 2017/0344743 A1 | 11/2017 | Shi |
| 2018/0013788 A1 | 1/2018 | Vissamsetty |
| 2018/0097840 A1 | 4/2018 | Murthy |
| 2018/0124085 A1 | 5/2018 | Frayman |
| 2018/0189508 A1 | 7/2018 | Li |
| 2018/0324201 A1 | 11/2018 | Lowry |
| 2019/0116193 A1 | 4/2019 | Wang |
| 2019/0166152 A1 | 5/2019 | Steele |
| 2019/0245831 A1 | 8/2019 | Petit |
| 2019/0253432 A1 | 8/2019 | Ohtani |
| 2019/0312836 A1 | 10/2019 | Phillips |
| 2019/0332765 A1 | 10/2019 | Fu |
| 2020/0137110 A1 | 4/2020 | Tyler |
| 2020/0145416 A1 | 5/2020 | Mitzimberg |
| 2020/0228547 A1 | 7/2020 | Kottapalli |
| 2020/0356664 A1 | 11/2020 | Maor |
| 2020/0404007 A1 | 12/2020 | Singh |
| 2021/0058395 A1 | 2/2021 | Jakobsson |
| 2021/0136037 A1 | 5/2021 | Balasubramaniam |
| 2021/0152595 A1 | 5/2021 | Hansen et al. |
| 2021/0160275 A1 | 5/2021 | Anderson |
| 2021/0194894 A1 | 6/2021 | Anderson |
| 2021/0218770 A1 | 7/2021 | Ben-Yosef |
| 2021/0264233 A1 | 8/2021 | Gronat |
| 2021/0273953 A1 | 9/2021 | Fellows |
| 2021/0280315 A1 | 9/2021 | Woldenberg |
| 2021/0336933 A1 | 10/2021 | Shah |
| 2021/0344667 A1 | 11/2021 | Huston, III |
| 2021/0400057 A1 | 12/2021 | Devane |
| 2022/0029965 A1 | 1/2022 | Chanak |
| 2022/0060498 A1 | 2/2022 | Head, Jr. |
| 2022/0217133 A1 | 7/2022 | Montgomery |
| 2022/0217169 A1 | 7/2022 | Varanda |
| 2022/0229906 A1 | 7/2022 | Balek |
| 2022/0329585 A1 | 10/2022 | Chhabra |
| 2022/0360983 A1 | 11/2022 | Raman |
| 2022/0368689 A1 | 11/2022 | Ben-Noon |
| 2022/0393943 A1 | 12/2022 | Pangeni |
| 2022/0398321 A1 | 12/2022 | Baldwin |
| 2022/0408255 A1 | 12/2022 | Howe |
| 2023/0079444 A1 | 3/2023 | Parla |
| 2023/0247003 A1 | 8/2023 | Chanak |
| 2023/0308458 A1 | 9/2023 | Varsanyi |

FOREIGN PATENT DOCUMENTS

| | | |
|---|---|---|
| CN | 114143034 A | 3/2022 |
| CN | 115396230 A | 11/2022 |
| EP | 1844399 B1 | 6/2019 |
| TW | M623435 | 2/2022 |
| WO | 2005125084 A1 | 12/2005 |
| WO | 2008074621 A1 | 6/2008 |
| WO | 2016191376 A1 | 12/2016 |
| WO | 2018157247 A1 | 9/2018 |
| WO | 2021009645 A1 | 1/2021 |

OTHER PUBLICATIONS

International Search Report and Written Opinion for PCT/US2020/020593, mailed Apr. 15, 2020, 8 pgs.

International Preliminary Report on Patentability for PCT/US2020/020593, Completed May 18, 2021, 8 pgs.

* cited by examiner

SYSTEM AND METHOD TO CREATE DISPOSABLE JUMP BOXES TO SECURELY ACCESS PRIVATE APPLICATIONS

CROSS REFERENCE TO RELATED APPLICATIONS

This application is a continuation-part of Ser. No. 17/521,092, filed Nov. 8, 2021, entitled "System and Method to Detect Lateral Movement of Ransomware by Deploying a Security Appliance Over A Shared Network To Implement A Default Gateway With Point-To-Point Links Between Endpoints", which is a continuation of U.S. patent application Ser. No. 17/357,757, filed Jun. 24, 2021, now issued as U.S. patent Ser. No. 11/171,985 on Nov. 9, 2021 entitled "System and Method to Detect Lateral Movement of Ransomware by Deploying a Security Appliance Over a Shared Network to Implement a Default Gateway with Point-To-Point Links Between Endpoints", which is hereby incorporated by reference in its entirety.

FIELD OF THE INVENTION

The present disclosure generally relates to techniques for ransomware protection.

BACKGROUND

Ransomware is one of the biggest threats facing the security industry today. Ransomware is a form of malware that infects computer systems. Ransomware is becoming an increasing problem in the computer/network security industry. Ransomware infects a computer system and encrypts files. A ransom is demanded in exchange for a decryption key.

Conventional enterprise security solutions have proved to be inadequate in view of the high-profile ransomware cases of large companies such as the Colonial Pipeline ransomware attack in 2021. The inadequacy of conventional enterprise security solutions is also evidenced by the fact that in 2020 51% of surveyed companies were hit by ransomware attacks.

Firewalls provide inadequate protection against ransomware attacks. In some companies, separate Virtual Local Area Networks (VLANs) are used to segment sections of a company by division as an additional layer of protection. For example, a finance department may have a separate VLAN domain than an engineering department. Or a finance department may have a different VLAN domain than a marketing department. However, this sort of segmentation of VLAN domains by departments doesn't address the problem of lateral movement of Ransomware attacks within a VLAN domain.

One of the reasons for the inadequacy of current enterprise security solutions is the difficulty of protecting against ransomware attacks within a shared VLAN based network architecture. If a device that is part of a shared VLAN broadcast domain is infected by ransomware or malware, there are very few security controls that can be implemented to prevent lateral propagation of the ransomware within the same VLAN network.

Referring to FIG. 1, a firewall 110 provides some limited protection against external ransomware attacks. However, a VLAN network also has east-west communication between endpoint devices 120 in a shared VLAN domain that is forwarded directly by the network router/switch 140. This east-west Intra-LAN communication is not visible to the network firewall 110 deployed up-stream on the network as shown in FIG. 1.

Current security solutions for lateral propagation protection of ransomware are based on endpoint protection. The drawback of these approaches is that it relies on an agent deployed on each endpoint to detect malicious ransomware processes being launched. Deploying and managing these agents is a challenge for IT organizations, and furthermore they cannot be deployed on IoT devices (such as web cameras, printers, and other devices) and are frequently not supported on older versions of operating systems.

Conventional VLAN network architectures have a potential gap in protection associated with lateral movement of ransomware between endpoint devices. Software application on endpoint devices provides only limited protection due to a variety of practical problems in managing software apps on endpoint devices and the presence of other IoT devices at endpoint devices, such as web cameras, printers, etc. There is thus a potential for ransomware to enter the VLAN network and laterally propagate to endpoint devices.

U.S. Pat. No. 11,171,985, assigned to Airgap, Inc., describes a technique to provide a secure access gateway to prevent lateral propagation of ransomware. However, additional techniques to block vectors of ransomware attack are desirable as part of a comprehensive solution.

SUMMARY

A technique to detect lateral propagation of ransomware between endpoints in a VLAN is disclosed. In one implementation, a smart appliance is deployed in an access port or a trunk port of VLAN network. The smart appliance is set as the default gateway for intra-LAN communication for two or more endpoint devices. Message traffic from compromised endpoints is detected. An example of a computer-implemented method of ransomware protection in a Virtual Local Area Network (VLAN) includes deploying a security appliance in an access or a trunk port of a shared VLAN environment. A subnet mask of 255.255.255.255 is used to set the security appliance as a default gateway for a plurality of endpoint devices of the shared VLAN environment. The security appliance monitors intra-VLAN communication between the plurality of endpoint devices of the shared VLAN environment. The security appliance detects lateral propagation of ransomware between endpoint devices via intra-VLAN communication in the shared VLAN environment.

In one implementation, an additional layer of protection for accessing private application includes the use of a disposable jump box. The disposable jump box is an additional layer of ransomware protection for access of a private application residing in a virtual cloud in which the secure access gateway resides by implementing at one policy to provision a disposable jump box for a session and terminate an activated disposable jump box after a termination condition is satisfied.

In one implementation, the disposable jump box is created in response to a user request to access a private application and terminated based on a security policy.

In one implementation, the security policy includes user permissions.

In one implementation, an automatic revocation policy is executed based on at least one of the termination of a session and a termination of time limit.

In one implementation, IP address tracking is performed of a user's IP address.

In one implementation, session isolation is performed to isolate the disposable jump box to a single user session.

In one implementation, audit and compliance information is recorded during a user session.

In one implementation, user session information is recorded.

One implementation of a method of using a disposable jump box includes:

receiving a user request for access to a private application, provisioning a disposable jump box for a session, generating and delivering secure credentials, using the credentials to establish a secure connection, providing access to a private application, and performing session termination and destruction of the disposable jump box.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

FIGS. 2-7 describe a secure access gateway to prevent lateral propagation of ransomware. FIGS. 8-11 describe a disposable jump box technique to provide an additional layer of ransomware protection. The two techniques may be used separately or in combination. In one implementation, a system for ransomware protection includes both techniques.

Secure Access Gateway

Figure 1:
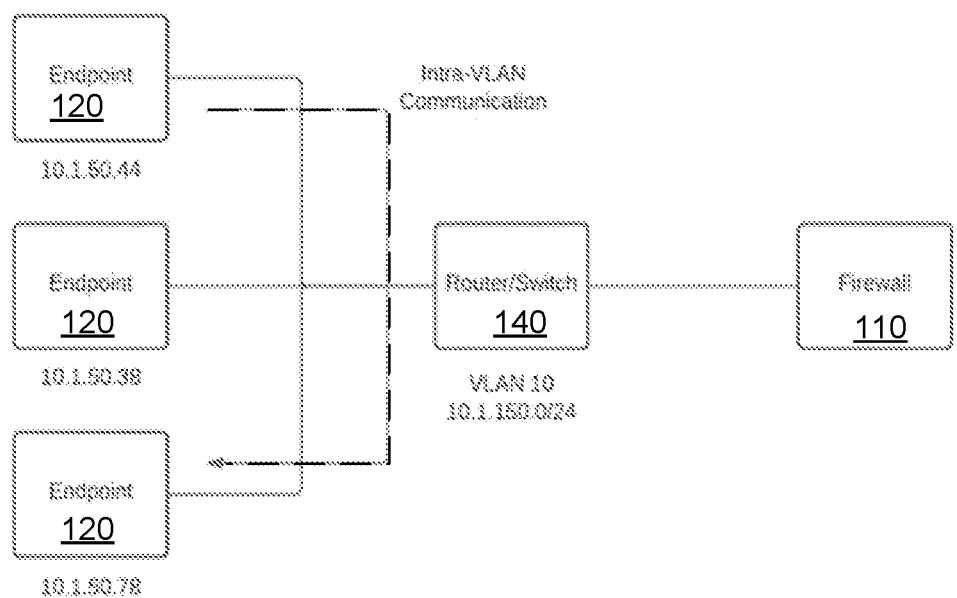
FIG. 1 is a block diagram illustrating Intra-LAN traffic in a conventional VLAN network.
Figure 2:
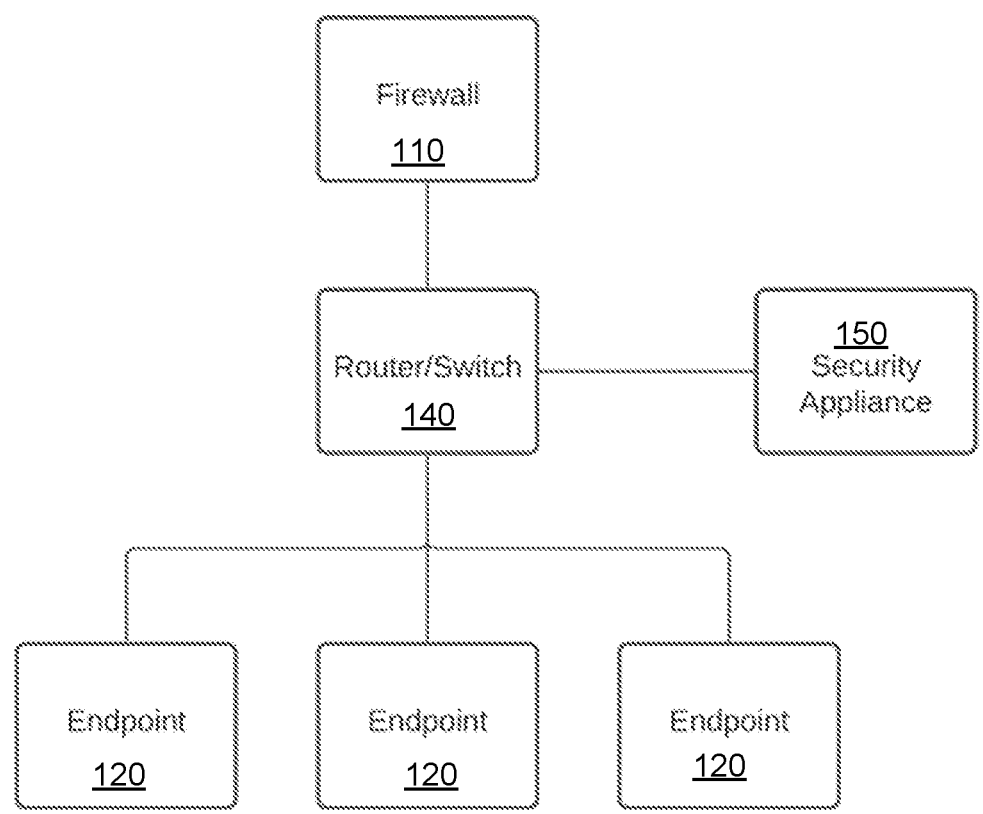
FIG. 2 is a block diagram illustrating a security appliance to provide protection from lateral movement of ransomware in accordance with an implementation.

FIG. 2 is a diagram illustrating a change to a network architecture to prevent lateral propagation of malware and ransomware. The operation of the network router/switch 140 is augmented and enhanced with a security appliance 150. The security appliance could be implemented in a variety of ways, such as using a mixture of hardware and software, firmware, etc. However, in one implementation it is implemented as software that may, for example, be stored on a memory and executed on a computer processor associated with a computing device such as the router/switch. In one implementation, it may be deployed on an existing port (e.g., an access port or a trunk port) of the VLAN network. As an illustrative example, the security application 150 may be implemented as software compatible with a virtual machine (VM) implementation, such as within a hypervisor implementation in VMware®. The security appliance may be deployed on a port that allows the security application to monitor and control the flow of message traffic across a network node for a plurality of endpoint devices with an individual VLAN domain or even across multiple VLAN domains. Deploying the security appliance on a trunk port is advantageous because a trunk port is a specific type of port on a network switch that allows data to flow across a network node for multiple virtual local area networks or VLANs. However, the security appliance could alternatively be deployed on an access port.

In one implementation, virtual point to point links between a security appliance 150 and each endpoint 120 are established in a shared VLAN domain that forces all traffic from an endpoint to traverse the security appliance 150. In one implementation, the security appliance is deployed on an access port or a trunk port on an existing router or switch.

In one implementation, the security appliance 150 becomes the default gateway and the Dynamic Host Configuration Protocol (DHCP) server responsible for dynamically assigning an IP address and other network configuration parameters to each endpoint device on the network so that they communicate with each other in the existing VLAN network.

When an individual endpoint 120 requests an IP address, the security appliance 150 responds back with an IP address and a subnet mask that sets the security appliance as the default gateway for the endpoint. In one implementation, the security appliance responds with a subnet comprised of all ones—255.255.255.255—that sets itself as the default gateway for the endpoint. Since the endpoint receives an IP address with a subnet mask of 255.255.255.255, any network communication with other endpoints or internet applications needs to be routed via the default gateway. In other words, a network with a subnet mask of 255.255.255.255 puts each device inside its own subnet, which forces them to communicate with the default gateway before communicating with any other device. The 255.255.255.255 subnet mask may also be referred to by the Classless Inter-Domain Routing (CIDR) prefix/32, which has one IP address. The CIDR number comes from the number of ones in the subnet mask when converted to binary. The 255.255.255.255 subnet mask corresponds to a CIDR prefix of/32.

Since the security appliance 150 sets itself as the default gateway for the network (by virtue of the subnet mask being comprised of all ones), any East-West communication between different endpoints 120 and communication between an endpoint 120 and other endpoints 120 or applications on different networks will be routed via it. This provides the security appliance with the unique ability to allow only authorized communication and disallow everything else.

Figure 3:
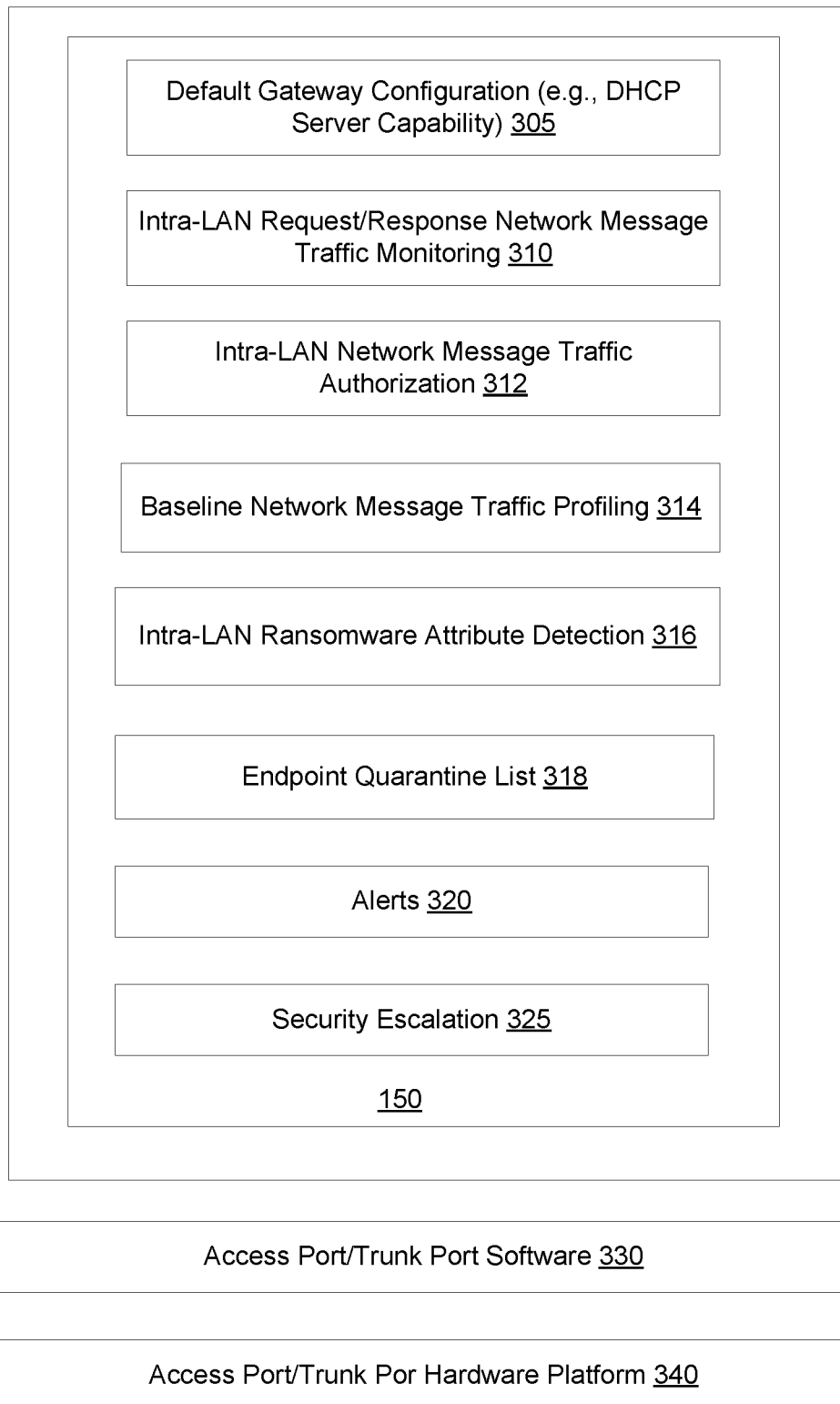
FIG. 3 is a block diagram illustrating components of a security appliance in accordance with an implementation.

FIG. 3 is a high-level diagram illustrating major functional blocks of the security appliance in one implementation. As previously discussed, the security appliance 150 may be deployed in an access port or in a trunk port associated with VLANs for a number of different endpoint devices (e.g., different laptop computers in a VLAN domain). It thus may be implemented as software stored on a computer memory and executable by a processor associated with an access port or a trunk port. For example, it may be implemented as software deployed with the software 330 and hardware 340 environment associated with an access port or a trunk port. In the example of FIG. 3, the security appliance 150 includes a default gateway configuration unit 305 to set the security appliance as a default gateway as described above (e.g., using a subnet mask of 255.255.255.255). An intra-LAN traffic monitoring unit 310 monitors intra-LAN traffic. This can include monitoring both request and response messages in intra-LAN traffic and detecting irregularities in intra-LAN request/response message traffic. An Intra-LAN network message traffic authorization unit 312 allows only authorized communication between the plurality of endpoint devices of the shared VLAN environment. For example, it may block unauthorized communication between endpoints. A baseline traffic profiling unit 314 may be optionally included to develop a baseline profile for typical or normal intra-LAN message traffic patterns between endpoint device 120. For example, the presence of ransomware may generate unusual amounts or types of traffic in comparison to a baseline profile. An Intra-LAN ransomware attribute detection unit 316 determines if one or more intra-LAN messages have computer code indicative of ransomware, such as computer code files to implement file scanning and encryption.

In the example of FIG. 3, the security appliance includes an endpoint quarantine unit 318 to quarantine compromised endpoints. This may include, for example, generating a list of quarantined endpoint devices that are used to block intra-LAN communication for compromised devices (i.e., to stop the lateral movement of ransomware). An alert unit 320 may be included to generate automated alerts, such as generating alerts for an administrator of an attempted ransomware attack. An optional security escalation unit 325 may be included to implement a security escalation protocol to increase security.

It will be understood that while the security appliance 150 may be deployed on an existing VLAN system, in some implementations it may also be incorporated into new VLAN system components, such as being incorporated into an access port or a trunk port.

Figure 4:
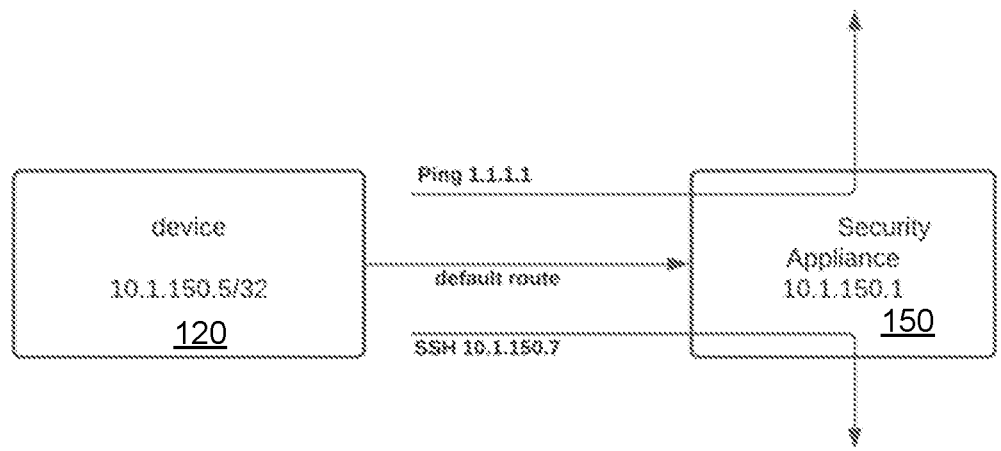
FIG. 4 illustrates the security appliance set as the default gateway in accordance with an implementation.

From the perspective of the endpoint 120, other endpoints and applications appear to be in a different IP network. Hence all outbound packets are sent to the default gateway as shown in FIG. 4. In this example, a /32 subnet is illustrated. However, more generally, a /31 or a /30 subnet may be used. Configuring a /32 subnet mask on endpoints forces all outbound network traffic via the security appliance 150. The security appliance 150 allows only authorized communication between endpoints, thereby significantly reducing the attack surface and lateral propagation by malware and ransomware. Detecting attempts by malicious actors to circumvent the protection provided by the security appliance permits quarantining devices which attempt to do so. Rapid quarantining of compromised endpoint devices stops the lateral propagation of ransomware. This, in turn, reduces the spread and potential damage of a ransomware attack.

Figure 5:
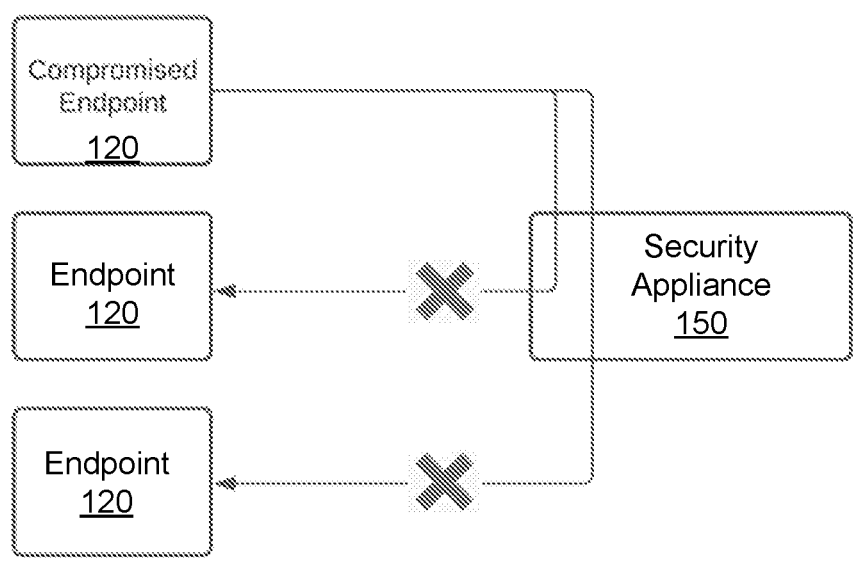
FIG. 5 illustrates how a security appliance may quarantine a compromised endpoint in accordance with an implementation.

FIG. 5 is a high-level block diagram illustrating an example of how lateral propagation of ransomware is prevented in accordance with an implementation. In this example, a compromised endpoint is infected with ransomware. The ransomware may, for example, have entered the compromised endpoint in a variety of different ways, such as through a peripheral IoT device in communication with the compromised endpoint.

Regardless of how the compromised endpoint became infected with ransomware, the security appliance 150 was earlier set as the default gateway. The security appliance 150 monitors message traffic and quarantines suspicious traffic from the compromised endpoint to other endpoints. This may include, for example, detecting message traffic that has attributes associated with ransomware, such as computer code for file scanning or encryption. It may also optionally include, in some implementations, detecting that message traffic that is unusual in comparison to a baseline profile of normal message traffic.

It is possible that ransomware in a compromised endpoint may attempt to directly communicate with another endpoint and bypass the security appliance 150. However, such an attempt to circumvent the security appliance 150 may still be detected and prevented.

Figure 6:
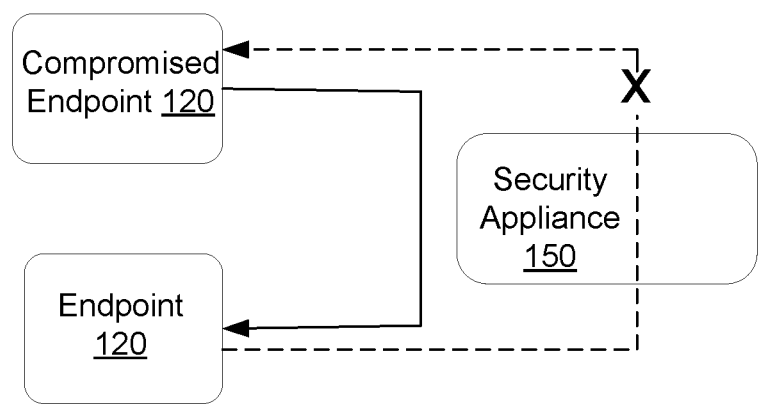
FIG. 6 illustrates how the security appliance may detect compromised endpoints attempting to circumvent the security appliance in accordance with an implementation.

FIG. 6 illustrates an example of how attempts to circumvent protection are detected. A compromised endpoint might, for example, have code in the ransomware that attempts to directly send request messages to another endpoint, bypassing the security appliance 150. However, an uncompromised endpoint will attempt to send its response message to the security appliance 150 as the default gateway. The security appliance 150 determines when it has detected a response from an endpoint directed to another endpoint but for which it has not detected a corresponding request. This discrepancy (a response message but no request message) may be used to identify that a compromised endpoint is attempting to circumvent the protection of the security appliance 150.

Figure 7:
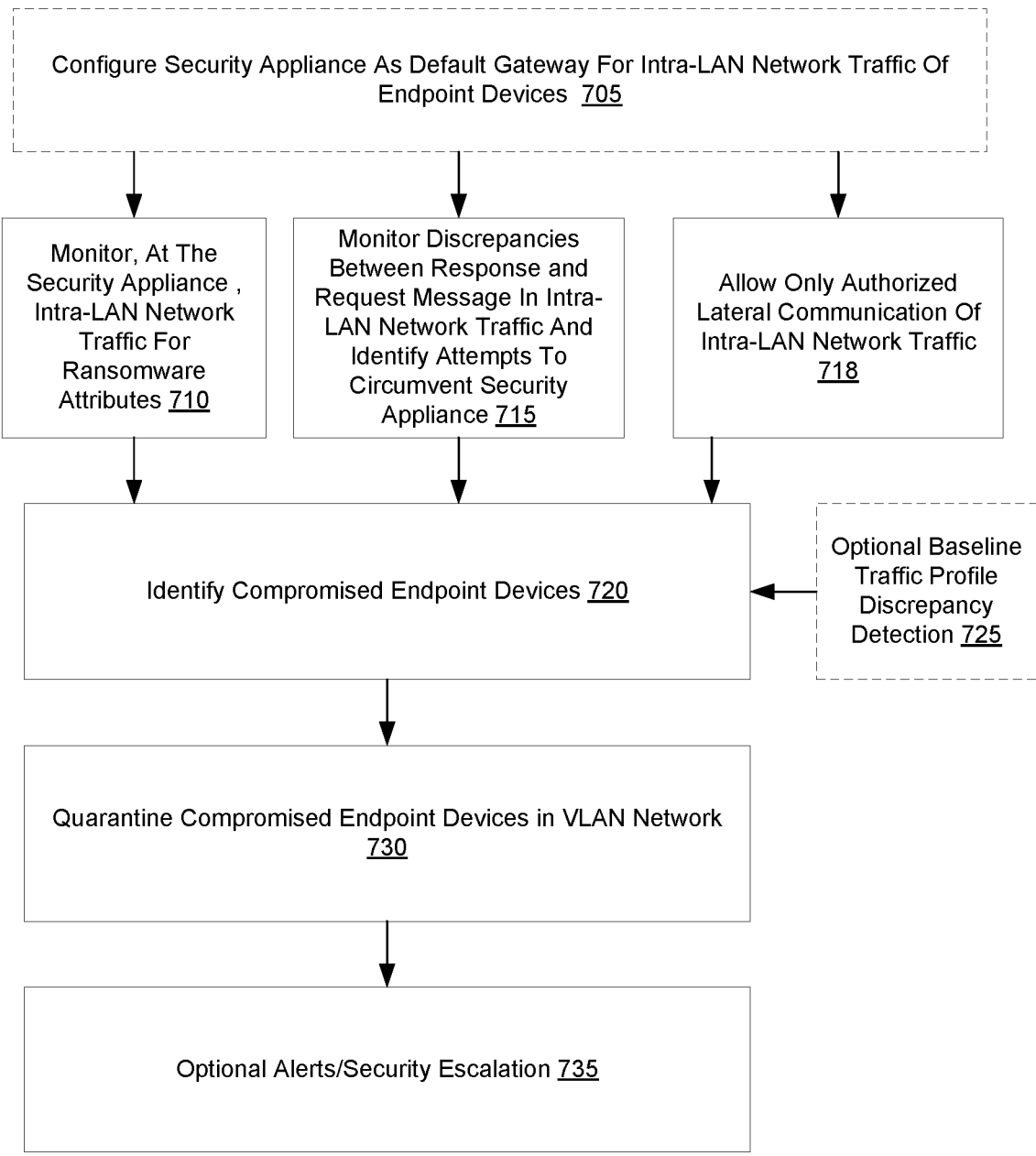
FIG. 7 is a flow chart of an example method for ransomware protection in accordance with an implementation.

FIG. 7 is a flow diagram of a method in accordance with an implementation. In block 705, a security appliance is configured as the default gateway for Intra-LAN network traffic of endpoint device. In block 710, the security appliance monitors intra-LAN network traffic for ransomware attributes. In block 715, the security appliance also monitors the intra-LAN message traffic for discrepancies between response and request messages in intra-LAN network traffic and identify attempts to circumvent the security appliance. In block 718, the method also includes the security appliance allowing only authorized lateral communication of Intra-LAN network traffic. In block 720, compromised endpoint devices are identified based on the outputs of blocks 710 and 715. Optionally, discrepancies with respect to a baseline message traffic profile from block 725 may be considered as an additional factor. In block 730, compromised endpoint devices are quarantined. This may include, for example, placing them on a list of quarantined devices, blocking communication with them, or taking other measures to isolate them. In block 735 optional alerts or security escalation may be performed. Security escalation could, for example, include implementing a security protocol to take a further action to mitigate or minimize the risk of further damage from a ransomware attack.

The security appliance 150 restricts communication in a manner that significantly reduces the attack surface available to the ransomware to exploit vulnerabilities in other endpoints and/or applications and propagate laterally. It detects attempts to circumvent the protection provided by the security appliance. If a compromised endpoint attempts to bypass the default gateway and tries to laterally propagate to another device, this attempt would be detected by the security appliance and appropriate action would be taken. This detection is because the uncompromised endpoint would still send the response packets to the compromised endpoint via the security appliance 150 (due to the /32 default route). The security appliance 150 detects the fact that it has seen a response packet to a request sent by the compromised endpoint, and it alerts the operator in this case. Automatic actions may be taken by the security appliance 150 including quarantining the compromised endpoint so that further lateral propagation is impossible.

Disposable Jump Boxes

Figure 8:
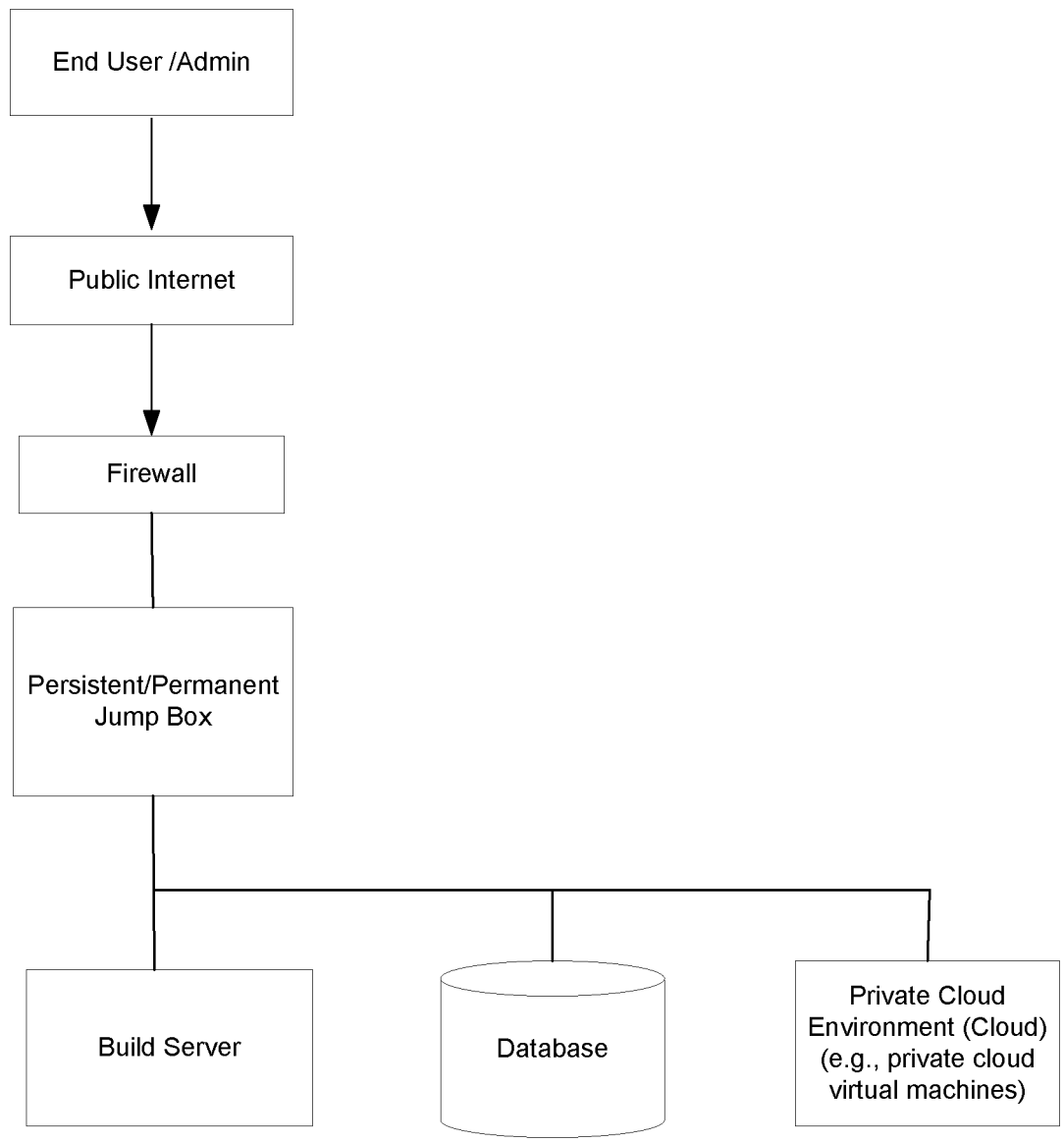
FIG. 8 illustrates a conventional permanent jump box being used to access a private application.

FIG. 8 illustrates a conventional application of jump boxes by end user/admins to access private servers and clouds servers. Conventional jump boxes, which are designed to be persistent/permanent are used by End Users/Admins to access private servers and cloud resources securely. However, conventional permanent jump boxes pose a variety of security issues. In modern IT and OT environments, ensuring secure and controlled access to private applications, particularly those within private networks, data centers, or cloud environments, is paramount. As some examples, such private applications may include Industrial Control Systems, Databases, Management Consoles, Development, and Build Servers, or other sensitive resources. Traditional methods often involve establishing direct connections to these private applications, often through VPNs or permanent jump boxes (also known as jump boxes or bastion hosts). Conventional permanent Jump Boxes are a technique to connect two networks, such as a common network and a sensitive security zone.

However, these traditional methods of access present several challenges:

1. Persistence of Access Points: Persistent permanent jump boxes or bastions, if compromised, can provide attackers sustained access to sensitive resources. They act as a potential single point of failure in security architectures.
2. Resource Overhead: Maintaining always-on, permanent jump boxes can be resource-intensive, leading to unnecessary costs and overhead.
3. Access Control Complexity: Administering permissions, monitoring, and logging for users across permanent jump boxes can become complex, especially in larger organizations with multiple private applications and numerous users.
4. Configuration Drift: Over time, configurations on persistent jump boxes can drift from the established baseline, leading to potential security vulnerabilities or access issues.
5. Scalability Concerns: In scenarios with high demand or concurrent access requirements, traditional permanent jump boxes may struggle to scale efficiently or might require significant pre-planning to handle peak loads.
6. Lack of Temporality: Given that many access requirements are temporary (e.g., a developer needing database access for debugging or an administrator performing routine maintenance), a persistent jump server might be overkill for such transient needs.

Figure 9:
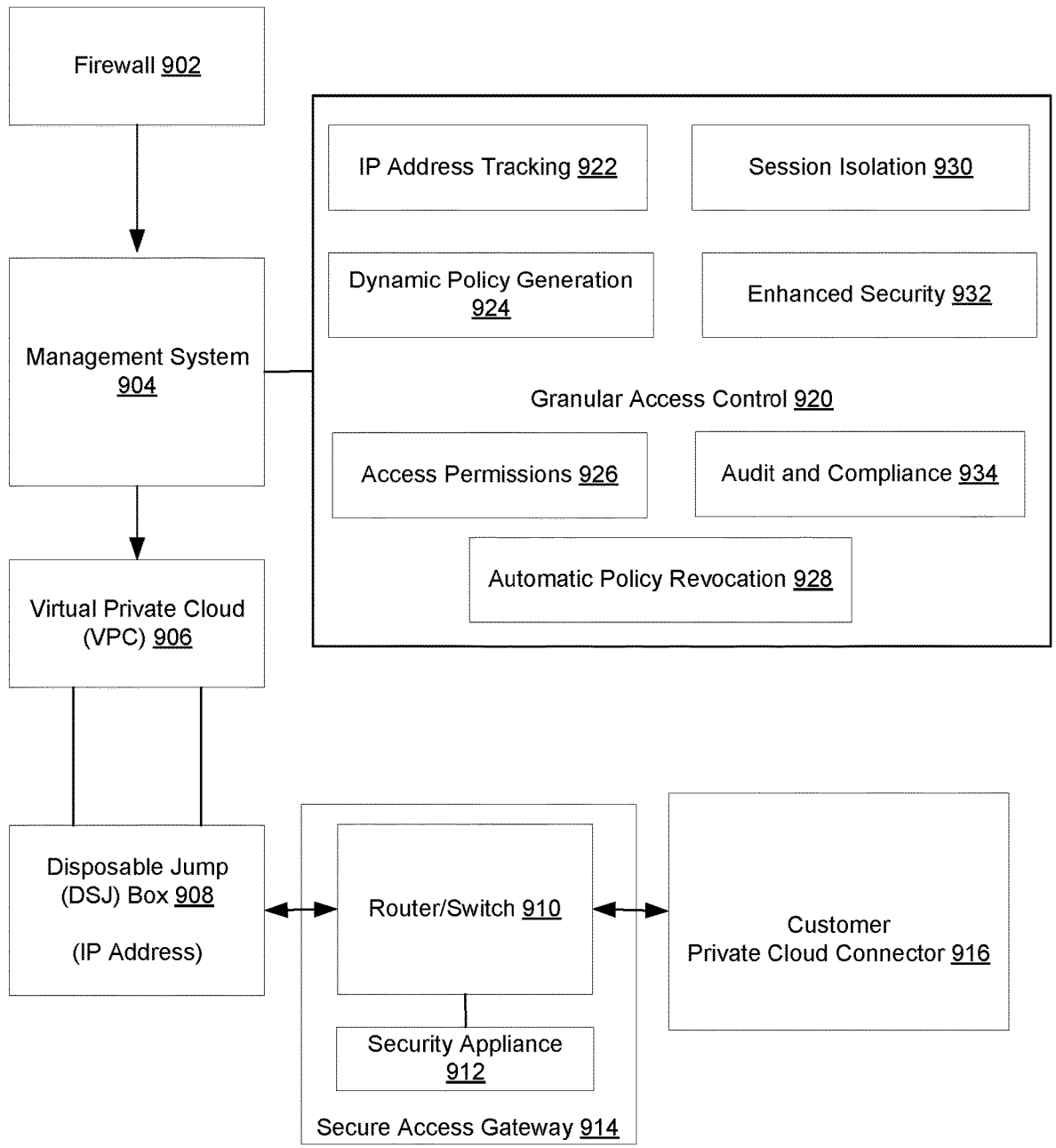
FIG. 9 illustrates a system using a disposable jump box and a secure access gateway to access a private application in accordance with an implementation.

In one implementation, a Disposable Jump Box is used to provide an additional security measure for on-demand secure access for Private Applications. FIG. 9 illustrates an example of a system using a Disposable Jump Box for on-demand secure access. A Disposable Jump Box (DSJ) system is provisioned on-demand and exists for a limited duration based on user requirements. This DSJ provides a temporary and secure access point into private resources without the persistence and vulnerability risks of traditional jump boxes.

In one implementation, a Disposable Jump Box System comprises a manage system 904, a virtual private cloud 906, a disposable jump box 908, a secure access gateway 914, and a customer private cloud connector 916. A granular access control 920 may include IP address tracking 922, dynamic policy generation 924, access permissions 926, automatic policy revocation 928, session isolation 930, enhanced security 932, and audit & compliance 934.

In one implementation, Management System 904 is a user-friendly interface through which end-users or admins request access to private applications. This is the initiation point for DSJ provisioning.

In one implementation, Disposable Jump Box (DSJ) 908 is a temporary virtual machine on a public cloud provider that is instantiated on-demand. Post its usage duration or once the user session is terminated, it's destroyed, ensuring no persistent vulnerability exists.

In one implementation, a Cloud VPC (Virtual Private Cloud) 906 is where the DSJ resides, ensuring a segregated and isolated environment and direct connectivity to the Secure Access Gateway. The Cloud VPC may be implemented as a virtual private machine. In one implementation, a separate Cloud VPC is created for each customer to ensure network isolation between the data path traffic belonging to different customers.

In one implementation, the Secure Access Gateway 914 is a dedicated, secure gateway that acts as the bridge between DSJs and private cloud environments. The Secure Access Gateway 914 may include a security appliance 912 and network router/switch 910 to act as a secure default gateway, similar to examples discussed previously.

In one implementation, the Granular Access Control Mechanism 920 performs one or more of the following functions:

1) Defines specific user roles and permissions, allowing only authorized individuals to access particular private applications.
2) Provides dynamic access based on user sessions and duration of sessions.
3) Logs and audits every access request, ensuring traceability and accountability.
4) Enables administrators to frequently update and modify permissions, adapting to changing organizational needs or security protocols.
5) Session Recordings: Automatic video recording of users' sessions coupled with collecting detailed logs ensures robust documentation, crucial for compliance and audit purposes.

Note that the private cloud and data center resources such as databases, enterprise systems, private cloud virtual machines and build servers may be protected using the secure gateway previously discussed.

Scalable System Upgrades: Any necessary upgrades to the system, including scaling the machine's size, can be swiftly executed on the base image, ensuring consistency and reducing potential errors.

In one implementation, connectors 916 are installed in customers' private cloud environments, these components actively initiate secure tunnels to the Secure Access Gateway, ensuring data integrity and confidentiality.

Figure 10:
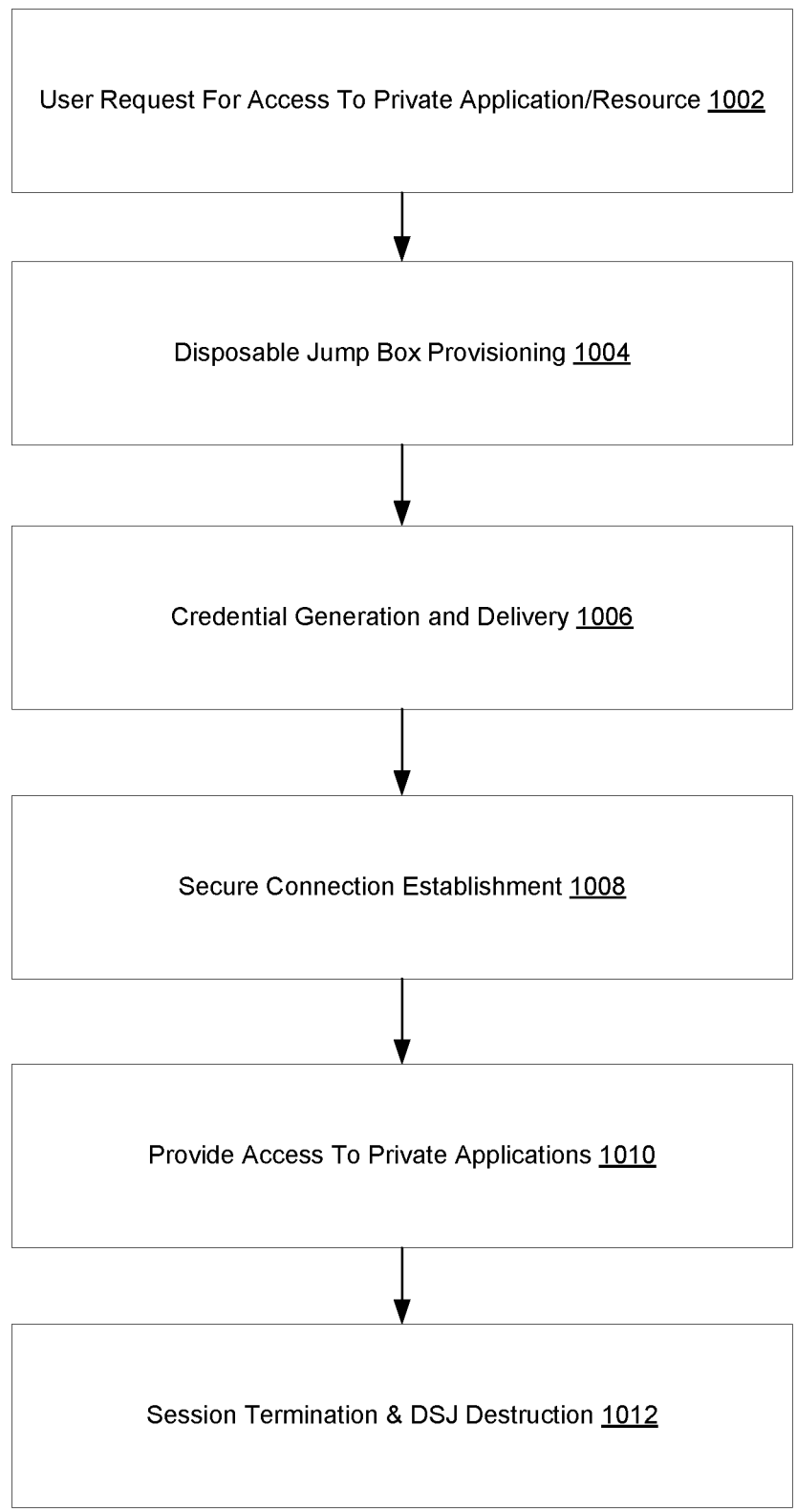
FIG. 10 illustrates a flowchart of an exemplary method in accordance with an implementation.

FIG. 10 illustrates an example process flow in accordance with an implementation. In block 1002, an end user (or administrator) makes a request directed to a private application or private resource. The end user/admin may visit the management system and request access to a specific private application or private resource. In block 1004, a disposable jump box is provisioned. The system instantiates a DSJ within the Cloud VPC. This DSJ is configured to have network connectivity to the Secure Access Gateway. In block 1006, credential generation and delivery are performed. In one implementation, when the DSJ is up, the system generates time-bound credentials and delivers them securely to the user via the management system. These credentials grant access to the DSJ and are valid for a predetermined period based on user requirements. In block 1008, secure connections are established. In one implementation, the user logs into the DSJ using the provided credentials. Simultaneously, the connector in the target private cloud environment initiates a secure tunnel to the Secure Access Gateway.

In block 1010, access is provided to private applications. In one implementation, access is provided via the secure tunnel that has been established. The user, through the DSJ, can directly access private applications in the target environment. The DSJ acts as a transparent access point with all traffic securely routed through the Secure Access Gateway.

In block 1012, session termination and DSJ destruction is performed. In one implementation once a user's tasks are completed, or the DSJ's time limit is reached, the session is terminated and the DSJ is destroyed, leaving no persistent access point. More generally a set of security conditions may be used to determine session termination and DSJ destruction.

Granular Access Control Mechanism

In one implementation, the Granular Access Control Mechanism enhances the security paradigm by adopting a precise, user-centric approach to accessing private applications. In one implementation it includes the following features:

1. DSJ IP Address Tracking: When a user initiates a DSJ session, the system automatically tracks and logs the unique IP address of the DSJ. This IP address becomes the user's identifier for that particular session.
2. Dynamic Policy Generation: Upon the user's request for accessing a specific private application, the system dynamically generates an IP Table Security policy tailored to that session.
3. Access Based on Permissions: This generated policy permits network traffic only from the identified DSJ IP address to the private applications for which the user has been granted access by the Security administrator.
4. Isolation of Sessions: By restricting access to specific IP addresses, the system ensures that each DSJ session is isolated. This means even if two users have permission to access the same application, they won't be able to intrude or interact with each other's sessions.
5. Enhanced Security: This approach significantly diminishes the risk of unauthorized access. Even if malicious actors were to obtain user credentials, they would be unable to access the private applications without also being on the authorized DSJ with the tracked IP address.
6. Audit and Compliance: The mechanism provides a detailed audit trail, as every access request, policy generation, and user interaction are logged based on the DSJ's IP. This comprehensive logging ensures transparency and facilitates compliance checks.
7. Automatic Policy Revocation: Once the DSJ session concludes, the dynamically generated IP Table Security policy is automatically revoked. This ensures that even if the DSJ were to be re-initiated, past access permissions wouldn't persist, further tightening the security.

Figure 11:
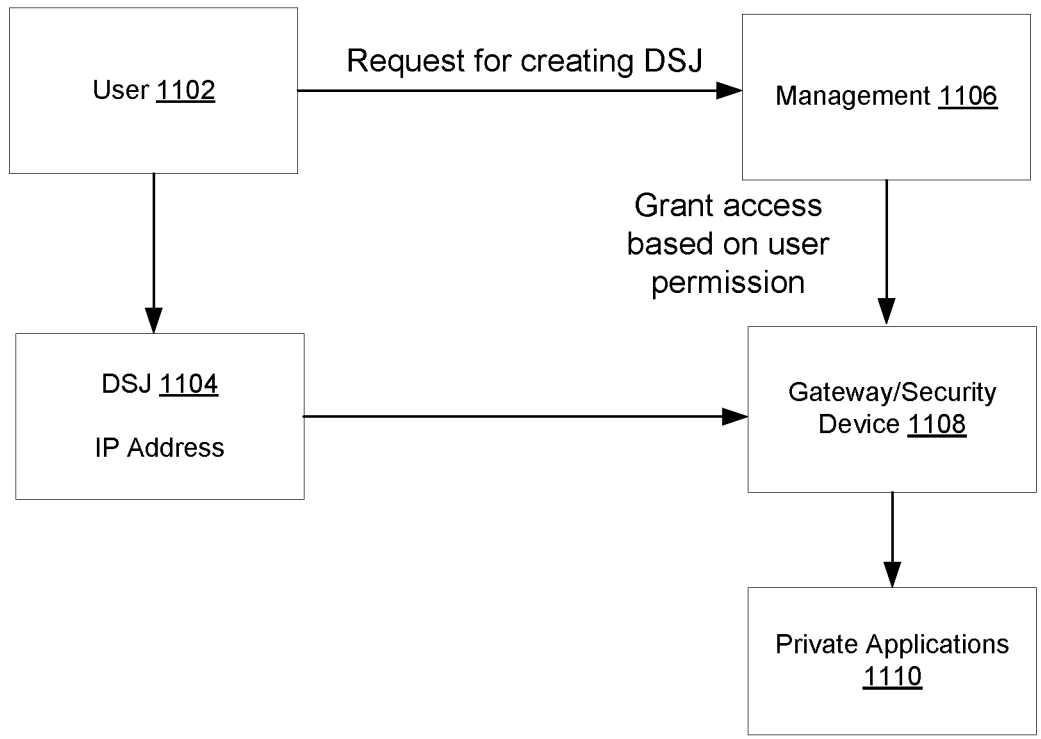
FIG. 11 illustrates aspects of an example of using a disposable jump box in accordance with an implementation.

FIG. 11 illustrates some of these considerations. In block 1102, the User/DSJ with a unique IP address requests access to a private application. In block 1106, the request is received by the Management System which checks the permissions for the user. In block 1108, based on the permissions, the Management System communicates with the Secure Access Gateway. In block 1110, the Secure Access Gateway dynamically generates a policy allowing traffic from the DSJ IP to the permitted private applications. In block 1104, the user's DSJ can now access the specified Private Applications based on the generated policy.

As an example of a granular security policy that may be implemented using IP tables to restrict access to a private application P. Consider the following policy to restrict access to a private IP address 10.0.0.5 using TCP port 8080 from a given DSJ with IP address 192.168.1.10. A granular security policy ensures that each DSJ session has restricted access, defined by the security policy generated by the Secure Access Gateway, to the specific private applications for which the user has permission.

Incorporating the Granular Access Control Mechanism, the DSJ and Secure Access Gateway solution ensures not just secure access but also fine-tuned, individualized access based on user roles and permissions, providing a balance between usability and security.

Minimizing Attack Surface

In one implementation, the system tracks user sessions and initiates session termination and destruction of the DSJ when an appropriate idle time is detected. This minimizes the attack surface by ensuring that the jump box does not persist as a constant target. Traditional, always-on jump boxes present a sustained point of entry for attackers. By ensuring the DSJ exists only for the required duration, the window of opportunity for malicious actors to target or exploit the system is considerably reduced.

Any potential malware, unauthorized software, or rogue configurations introduced during a DSJ session are automatically discarded post-session. This ensures that malicious entities do not persist and propagate, preventing future exploitation based on remnants from previous sessions.

By utilizing a pristine image, every DSJ starts from a known, trusted state. This baseline image contains only authorized software, configurations, and patches, ensuring that the DSJ is free from any unauthorized modifications or potential vulnerabilities from the outset.

DSJ Activity Tracking Mechanism

In one implementation, the following algorithm is used to track session activity on DSJs and decide when to initiate session termination and destruction of the DSJ. An example is given for Microsoft Windows Operating System:

1. DSJ Activity Tracking Mechanism:

A scheduled task will be provisioned on the DSJ to periodically execute the user command, listing users logged onto the system and their respective states.

A script will parse the output of the user command, extracting essential parameters such as USERNAME, STATE, IDLE TIME, and LOGON TIME. This information will be saved in an activity log on the DSJ, establishing a comprehensive audit trail.

2. Reporting Mechanism to Management System:

The parsed data will be formatted into a structured format, such as JSON, suitable for transmission via RESTful API calls.

A subsequent script will perform a POST request to the designated API endpoint of the Secure Access Gateway, transmitting the structured data.

Response handling mechanisms will be implemented, ensuring feedback from the API call is captured. Failures will trigger a local error log, and a retry mechanism will be introduced.

3. Management System Processing:

In one implementation, the Secure Access Gateway incorporates a RESTful API endpoint to receive, process, and store the reported DSJ activity data. In one implementation, the Management System will initiate Session Termination and destruction of the DSJ if an idle time greater than a configurable time is reached. Session Termination will also be initiated based on a configurable maximum user timeout.

DSJ Summary

A System and Method to Create Disposable Jump Boxes to Securely Access Private Applications offers customers the following benefits:

1. Enhanced Security

Each DSJ is instantiated from a pristine image, ensuring that every session starts from a known, uncompromised state. The transient nature of DSJs eliminates the risk of persistent vulnerabilities. If a DSJ is compromised, the threat surface is limited and temporary.

2. Secure Connections

With the Secure Access Gateway and the connectors, users can establish a direct, secure tunnel to the private applications, mitigating potential interception threats.

3. Granular Access Control

The system offers refined access controls, ensuring users can only access resources aligned with their roles and permissions.

4. Ease of Use

Users don't need to manage or configure permanent infrastructure. The system automates the DSJ's lifecycle based on user needs.

5. User Activity Monitoring

Real-time tracking of all user actions on the DSJ, providing a continuous oversight to detect and respond to anomalies promptly.

6. Cost Efficiency

On-demand provisioning means resources are consumed only when needed, leading to cost savings.

7. Scalability

The system can handle multiple simultaneous DSJ requests, catering to large user bases without performance degradation.

8. Efficiency in Updates

Eliminating the cumbersome process of deploying software upgrades to a vast number of corporate PCs. By updating the pristine image, every DSJ inherits the latest changes, streamlining the update process.

9. Optimal Performance

Traditional PCs often suffer performance degradation over time due to the accumulation of unwanted applications, cache, and temporary files. Given that a fresh DSJ is created for every session, such build-ups are non-existent, ensuring peak performance and thereby enhancing staff productivity.

10. Flexible & Adaptable

Can be integrated with various private cloud environments through connectors, making it versatile for different use cases.

This approach combines the efficiency and security of disposable on-demand resources with the convenience of direct access to private applications, offering a modern, robust solution for secure access needs.

Alternate Embodiments

Other implementations of one or more of these aspects include corresponding systems, apparatus, and computer programs, configured to perform the actions of the methods, encoded on computer storage devices.

These and other implementations may each optionally include one or more of the following features.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method of ransomware protection in a Virtual Local Area Network (VLAN), comprising:
    utilizing a security access gateway in a shared VLAN environment by using a subnet mask of 255.255.255.255 to set a security appliance as a default gateway for a plurality of endpoint devices of a shared VLAN environment;
    monitoring, by the security appliance, intra-VLAN communication between the plurality of endpoint devices of the shared VLAN environment to prevent lateral propagation of ransomware; and
    providing a disposable jump box as additional layer of ransomware protection for access of a private application residing in a virtual cloud in which the secure access gateway resides by implementing at one policy to provision a disposable jump box for a session and terminate an activated disposable jump box after a termination condition is satisfied.

2. The computer-implemented method of claim 1, wherein the disposable jump box is created in response to a user request to access a private application and terminated based on a security policy.

3. The computer-implemented method of claim 2, wherein the security policy includes user permissions.

4. The computer-implemented method of claim 2, further comprising executing an automatic revocation policy based on at least one of a termination of a session and a termination of time limit.

5. The computer-implemented method of claim 2, further comprising performing IP address tracking of a user's IP address.

6. The computer-implemented method of claim 2, further comprising performing session isolation to isolate the disposable jump box to a single user session.

7. The computer-implemented method of claim 2, further comprising recording audit and compliance information during a user session.

8. The computer-implemented method of claim 7, wherein user session information is recorded.

9. The computer-implemented method of claim 1, wherein the method comprises: receiving a user request for access to a private application, provisioning a disposable jump box for a session, including generating and delivering secure credentials to establish a secure connection, providing access to a private application, and performing session termination and destruction of the disposable jump box.

10. A computer-implemented method of ransomware protection in a Virtual Local Area Network (VLAN), comprising:
    utilizing a security access gateway in a shared VLAN environment by using a subnet mask of 255.255.255.255 to set a security appliance as a default gateway for a plurality of endpoint devices of a shared VLAN environment;
    monitoring, by the security appliance, intra-VLAN communication between the plurality of endpoint devices of the shared VLAN environment to prevent lateral propagation of ransomware; and
    providing additional projection against ransomware using a disposable jump box for an individual user session to access a private application, including:

receiving a user request for access to a private application;

provisioning a disposable jump box for a session, including generating and delivering secure credentials to establish a secure connection providing access to a private application; and performing session termination and destruction of the disposable jump box.

11. The method of claim 10, further comprising: allowing, by the security appliance, only authorized communication between the plurality of endpoint devices of the shared VLAN environment.

12. The method of claim 11, wherein the security appliance blocks unauthorized communication between the plurality of endpoint devices of the shared VLAN environment.

13. The method of claim 10, further comprising: quarantining an endpoint device compromised by ransomware.

14. The computer-implemented method of claim 13, wherein the quarantining comprises blocking intra-VLAN communication of a compromised endpoint device.

15. A Virtual Local Area Network (VLAN) system, comprising:
   a management system;
   a virtual private cloud;
   a disposable jump box;
   a secure access gateway including a security appliance configured as a default gateway for intra-VLAN communication of a plurality of endpoint devices using a subnet mask of 255.255.255.255, the security appliance configured to monitor intra-VLAN message traffic, and detect lateral propagation of ransomware between endpoint devices via intra-VLAN communication in a shared VLAN environment; and
   the disposable jump box being provisioned for an individual use session to access a private application via the secure access gateway and session and terminated after a termination condition is satisfied.

16. The system of claim 15, wherein the disposable jump box is created in response to a user request to access a private application and terminated based on a security policy.

17. The system of claim 16, wherein the security policy includes user permissions.

18. The system of claim 16, wherein an automatic revocation policy for the disposable jump box is based on at least one of a termination of a session and a termination of time limit.

19. The system of claim 16, further comprising an IP address tracking module to track a user's IP address.

20. The system of claim 16, further comprising a session isolation module to isolate the disposable jump box to a single user session.

21. The system of claim 16, further comprising a recording audit and compliance module to record audit and compliance information during a user session.

22. The system of claim 21, wherein user session information is recorded.

* * * * *